(12) United States Patent
Koop (10) Patent No.: US 10,486,641 B2
(45) Date of Patent: Nov. 26, 2019

(54) CAR-TRANSPORTABLE CRADLE FOR INJURED ANIMALS (71) Applicant: Rosemary Koop, Oregon City, OR (US)

(72) Inventor: Rosemary Koop, Oregon City, OR (US)

(*) Notice: Subject to any disclaimer, the term of this patent is extended or adjusted under 35 U.S.C. 154(b) by 345 days.

(21) Appl. No.: 15/617,964

(22) Filed: Jun. 8, 2017

(65) Prior Publication Data
US 2017/0355348 A1  Dec. 14, 2017

Related U.S. Application Data (60) Provisional application No. 62/347,362, filed on Jun. 8, 2016.

(51) Int. Cl.
A01K 1/02 (2006.01)
B60R 22/10 (2006.01)
A01K 27/00 (2006.01)
A01K 15/04 (2006.01)
A01K 15/00 (2006.01)

(52) U.S. Cl.
CPC ............ B60R 22/10 (2013.01); A01K 1/0272 (2013.01); A01K 15/00 (2013.01); A01K 15/04 (2013.01); A01K 27/002 (2013.01)

(58) Field of Classification Search
CPC .. A01K 1/0272; A01K 1/0281; A01K 1/0236; A01K 1/05; A01K 1/029; A01K 1/0353; A01K 1/0157; B60R 22/10; B60N 2/24; B60N 2/00; B60N 2/30; B60N 2/26; B60N 2/2821
See application file for complete search history.

(56) References Cited

U.S. PATENT DOCUMENTS

| 3,054,637 | A | * | 9/1962 | Pambello | A47D 11/005 224/155 |
| 5,133,294 | A | * | 7/1992 | Reid | A01K 1/0272 119/771 |
| 6,588,365 | B2 | * | 7/2003 | Best Wright | A01K 1/0272 119/28.5 |
| 7,617,797 | B2 | * | 11/2009 | Lam | A01K 1/0245 119/28.5 |

(Continued)

FOREIGN PATENT DOCUMENTS

WO   WO-2019079244 A1 * 4/2019 ............... A47D 1/10

Primary Examiner — Kristen C Hayes (57) ABSTRACT

A car-transportable cradle for injured animals used to hold a pet in place while riding in a car. The apparatus includes a resting panel, a first wing, a second wing, a first handle, a second handle, a first harness-attachment point, a second harness-attachment point, a standing base, and a car-seat securing mechanism. The resting panel retains an injured animal in a semi-recumbent position. The first wing and the second wing enclose the sides of the resting panel preventing the injured animal from being displaced from the proper securing position. The first handle and the second handle provide the user with gripping surfaces to easily transport the present invention into and out or a passenger car. The standing base retains the present invention securely on top of the car-seat. The car-seat securing mechanism prevents the present invention ensure the present invention remains mounted when the car accelerates or changes direction.

17 Claims, 7 Drawing Sheets (56) References Cited

U.S. PATENT DOCUMENTS

| | | | | |
|---|---|---|---|---|
| 7,717,062 | B2* | 5/2010 | Kline | A01K 1/0272 |
| | | | | 119/28.5 |
| 8,539,909 | B2* | 9/2013 | Williams | A01K 1/0353 |
| | | | | 119/28.5 |
| 8,714,111 | B2* | 5/2014 | Bryson | A01K 1/0254 |
| | | | | 119/453 |
| 8,807,650 | B2* | 8/2014 | Ascher | B60N 2/0232 |
| | | | | 297/284.3 |
| 9,030,313 | B1* | 5/2015 | Pearson | B60N 2/26 |
| | | | | 180/273 |
| 9,226,473 | B2* | 1/2016 | Hoffman | A01K 1/0035 |
| 10,000,143 | B1* | 6/2018 | Linnel | B60N 3/08 |
| 2008/0156275 | A1* | 7/2008 | Lam | A01K 1/0245 |
| | | | | 119/497 |
| 2009/0314219 | A1* | 12/2009 | Bryson | A01K 1/0245 |
| | | | | 119/496 |
| 2010/0139573 | A1* | 6/2010 | Wilson | A01K 1/0254 |
| | | | | 119/496 |

* cited by examiner

CAR-TRANSPORTABLE CRADLE FOR INJURED ANIMALS

The current application claims a priority to the U.S. Provisional Patent application Ser. No. 62/347,362 filed on Jun. 8, 2016.

FIELD OF THE INVENTION

The present invention generally relates to a car-transportable cradle injured animals. In particular, a car-transportable cradle for injured animals with a car-seat securing mechanism capable of arresting forward and backward momentum of the car-transportable cradle created under instances of acceleration and deceleration is disclosed.

BACKGROUND OF THE INVENTION

In the field of animal welfare, it is often the case that when an animal is injured, sick, or in general discomfort, the animal can get agitated. An injured animal is aggravated very easily and oftentimes become very aggressive towards anyone who tries to get near it, such as caretakers or medical personnel. Further, the animal can also start struggling and moving around in a violent manner to try to get away from its caretaker or owner. This can result in the animal exacerbating its injuries and prevents successful treatment of the animal. This kind of situation is especially difficult for pet owners who do not have the means to treat their pet by themselves. The pet owners have to try to calm the aggravated and aggressive pet enough so that it can be transported to a medical treatment for successful treatment of its injury.

Recent AAA surveys have shown that 64 percent of pet owners partake in unsafe distracted driving habits with their pets in the car. An additional 29 percent of the respondents admitted to being distracted while driving with their pets, and another 84 percent indicated that they do not secure their pet in their car. Oftentimes, the pet or animal is cause of distraction for the driver which can cause unsafe driving and accidents. This creates an especially dangerous situation as during a 35-mile-per-hour crash, an unrestrained 60-pound animal would exert the force of a 2700-pound load. Unrestrained animals can impede rescue workers in more serious accidents, and are more likely to get hurt themselves or even be thrown out of the vehicle.

The objective of the present invention is to provide a car-transportable cradle for carrying sick and/or injured animals to and from a veterinary facility. It is yet another objective of the present invention to provide a means to securely retain the animal in the cradle which it is being transported, to ensure that the animal does not hurt itself or the veterinary workers. It is yet another objective of the present invention to provide a way to fasten the car-transportable cradle to the seat of the car in a highly secure manner, that can withstand the forces generated when the car accelerates and brakes.

The present invention is a car-transportable cradle for transporting injured or sick animals inside a passenger car. The present invention is designed to transport recently injured, sickly, or unconscious animals, in this case pet animals, in a safe manner to and from urgent care, clinics, home, etc. A novel car-seat securing mechanism keeps the present invention stable when the car carrying the present invention accelerates, turns, or brakes. Further, several supplemental seat fasteners are provided to fasten the present invention to various anchoring points that can be found in and around conventional car seats.

The present invention is molded out of 100% non-porous medical grade plastic. The use of high grade materials allows the present invention to go through a thorough sterilization and disinfection process. The disinfection and sterilization process removes contaminants such as contagious viruses borne out of the bodily fluids of the animal being transported. Once disinfected, the present invention can be reused for an indefinite amount of time. This presents a clear improvement in the field of car-transportable animal carriers available in the public domain.

The present invention is designed as a durable medical equipment for professional facilities, hospitals, and clinics, which is made available to the clients of said organizations, to ensure their animals are transported in a safe and comfortable manner. The present invention may also be used by pet owners or breeders who have desire for a safe way to transport dogs in case of an emergency. The present invention may also be sold through commercial outlets or rented for a single use scenario.

DETAILED DESCRIPTION OF THE INVENTION

All illustrations of the drawings are for the purpose of describing selected versions of the present invention and are not intended to limit the scope of the present invention.

Figure 1:
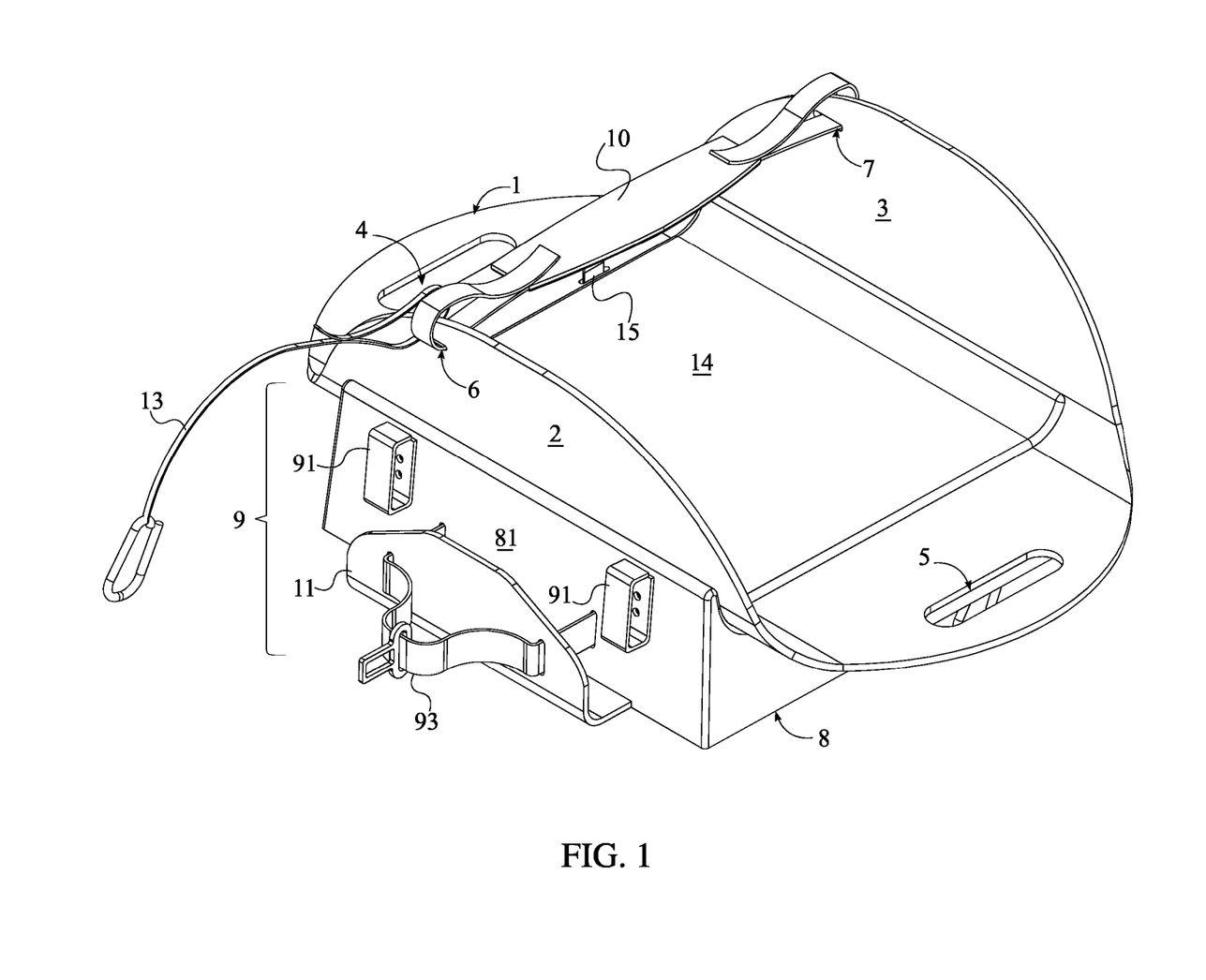
FIG. 1 is a front perspective view of the present invention.

The present invention is a transportable cradle suited to transport animals in a car seat. Referring now to FIG. 1, the preferred embodiment of the present invention comprises a resting panel 1, a first wing 2, a second wing 3, a first handle 4, a second handle 5, a first harness-attachment point 6, a second harness-attachment point 7, a standing base 8, and a car-seat securing mechanism 9. The resting panel 1 allows the animal to rest in a semi-reclined position with its legs folded below its body. This is the natural resting position for most quadrupedal animals, so the animal can remain seated for prolonged periods of time without feeling irritated or uncomfortable, as may be required during long journeys. The resting panel 1 is connected onto the standing base 8. The standing base 8 suspends the resting panel 1 over the car seat, preventing the resting panel 1 from sinking into the seat cushion. This also prevents the resting panel 1 from leaning sideways, which can displace the animal from the proper position. In the preferred embodiment of the present invention, the resting panel 1 may be adhered, fastened, or integrated into the standing base 8 during the fabrication process. Alternately, the resting panel 1 may be removably coupled to the standing base 8 with snap locks, magnets, or screws. The use of hundred-percent non-porous medical grade plastic enables the present invention to be disinfected and reused, however, any such rigid, lightweight, and/or chemically non-reactive material can be utilized. The resting panel 1 can be adjustably sized during the fabrication process to provide sufficient space for large or small animals.

Figure 2:
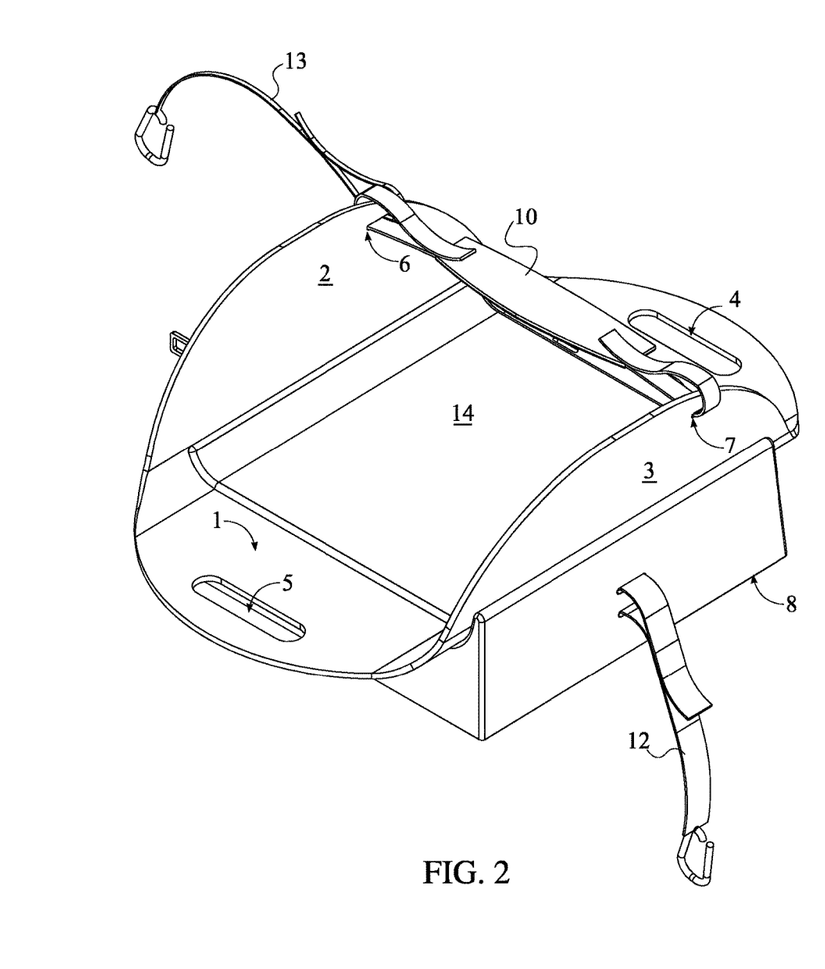
FIG. 2 is a rear perspective view of the present invention.

As can be seen in FIG. 2, the car-seat securing mechanism 9 is laterally mounted to the standing base 8. The car-seat securing mechanism 9 secures the resting panel 1 and the standing base 8 to the car seat. The first wing 2 is connected adjacent to the resting panel 1. The second wing 3 is connected adjacent to the resting panel 1 opposite the first wing 2. The first wing 2 and the second wing 3 form protective barriers that retain the animal in the center of the resting panel 1. The first handle 4 and the second handle 5 are positioned opposite each other across the resting panel 1. The first handle 4 and the second handle 5 are positioned perpendicular to the first wing 2 and the second wing 3. A user may grip the first handle 4 to transport the present invention when it is not carrying an animal. The user must use both the first handle 4 and the second handle 5 to transport the present invention when it is carrying an animal. The first handle 4 and the second handle 5 are placed symmetrically about the center axis. When the user grips the first handle 4 and the second handle 5 to lift the present invention, the load is distributed evenly about the center axis, which reduces excess stress on the user's wrists. The first harness-attachment point 6 is integrated into the first wing 2. The second harness-attachment point 7 is integrated into the second wing 3. The first harness-attachment point 6 and the second harness-attachment point 7 are preferably fashioned out of elongated slots cut into the first wing 2 and the second wing 3.

Figure 7:
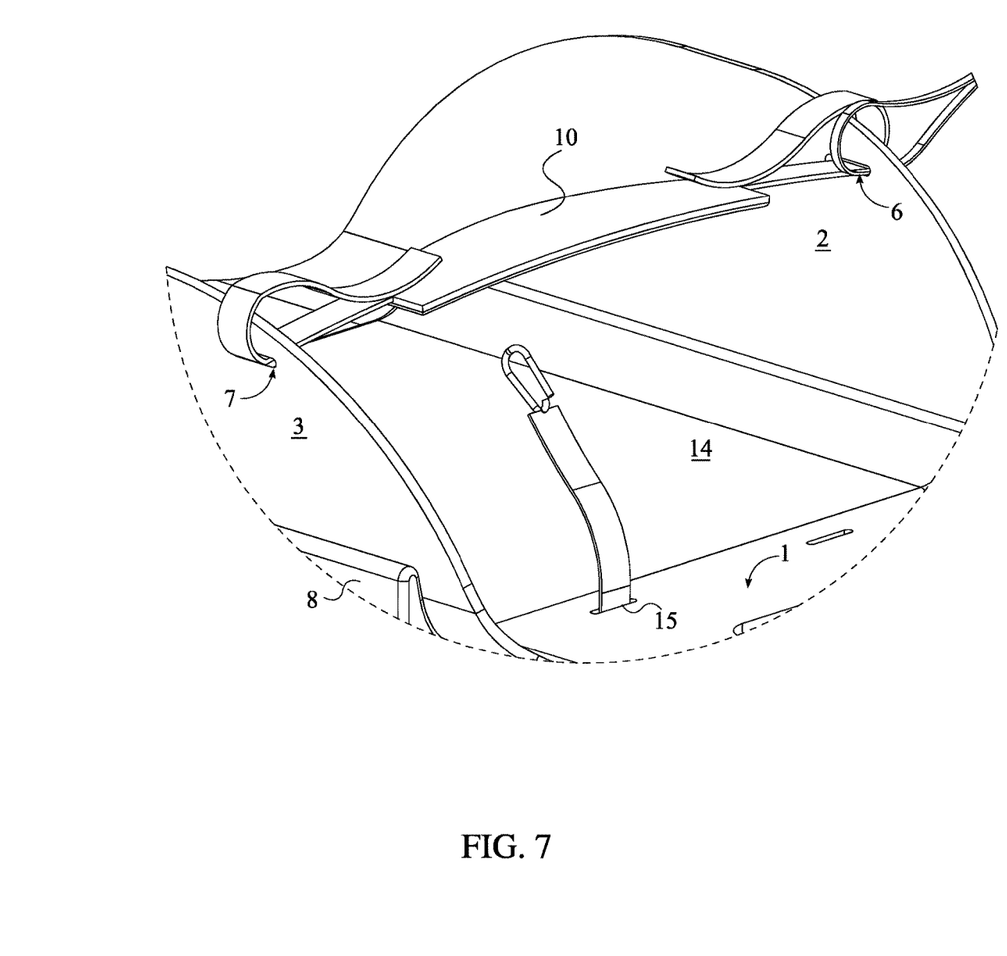
FIG. 7 shows a detail front perspective view showing the animal harness attached to the first harness-attachment point and the second harness-attachment point.

Referring now to FIG. 7, the present invention may further comprise an animal harness 10 that is tethered in between the first harness-attachment point 6 and the second harness-attachment point 7. The animal harness 10 secures the top opening of the resting panel 1 and keeps the animal's torso close to the resting panel 1. This increases stability and prevents the animal from fall out of the resting panel 1. The animal harness 10 is preferably composed of a high strength fabric strap with a first adjuster clip and a second adjuster clip. The first end of the animal harness 10 is looped around the first harness-attachment point 6 and inserted into the first adjuster clip. This prevents the first end from slipping out of the first harness-attachment point 6 and preserves the loop in its position. The second end of the animal harness 10 loops around the second harness-attachment point 7 and is secured in position by the second adjuster clip. The portion of the animal harness 10 pressing against the animal's body may be lined with a soft padding or cushioning material to reduce irritation to the animal. In another embodiment, the animal harness 10 may comprise a strap system that wraps around the whole torso of the animal. The first adjuster clip and the second adjuster clip also allows the user to adjust the tightness of the animal harness 10 around the torso of the animal. In another possible embodiment of the present invention, a plurality of animal harnesses 10 is used to restrain a large animal. In this embodiment, a plurality of first harness-attachment points 6 and a plurality of second harness-attachment points 7 are used to secure the plurality of animal harnesses 10 to the resting panel 1. The car-seat securing mechanism 9 may also scales to successfully span the enlarged resting panel 1.

Figure 4:
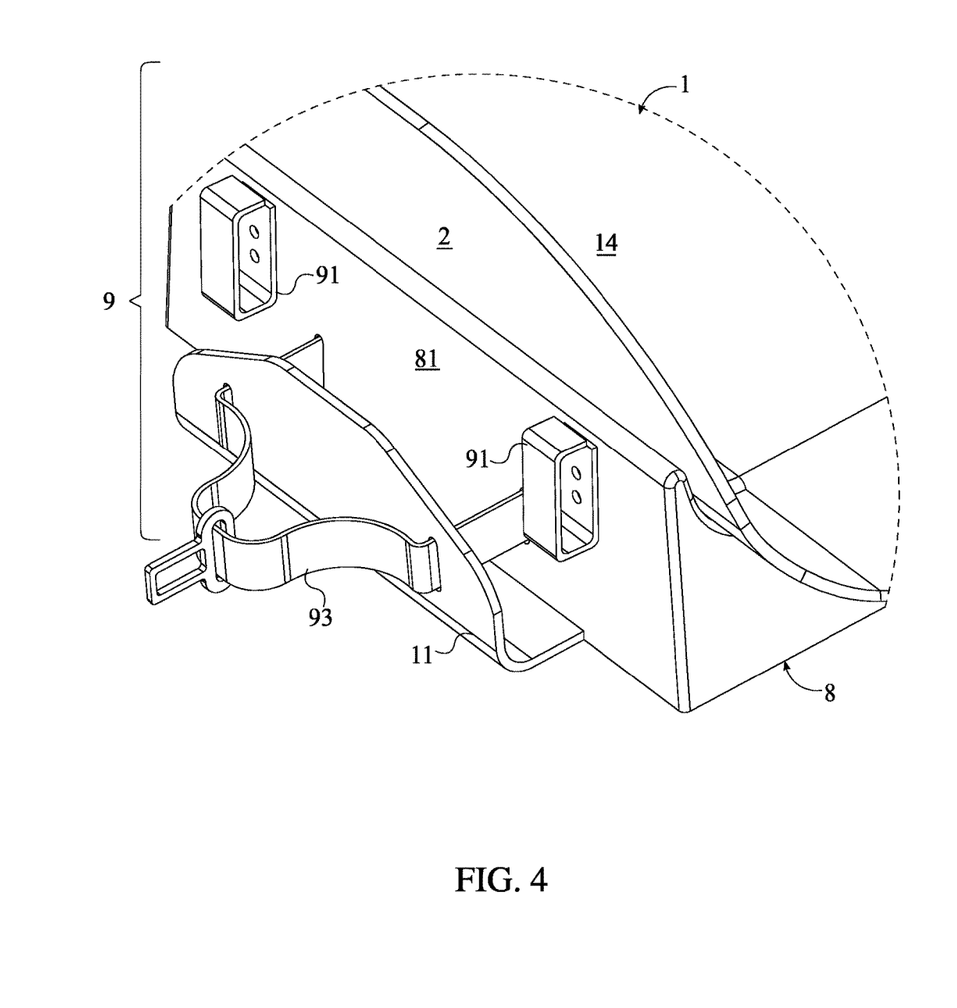
FIG. 4 shows a detail perspective view of the bracing portion and the car-seat securing mechanism.

Referring not to FIG. 4, an offsetting flange 11 is laterally connected to the standing base 8. The offsetting flange 11 offsets the standing base 8 away from the back cushion of the car seat. The vertical wall of the offsetting flange 11 provides a physical barrier which prevents the standing base 8 from tipping over into the car seat when the car starts accelerating. The preferred embodiment of the car-seat securing mechanism 9 comprises a plurality of belt hooks 91. A bracing portion 81 of the standing base 8 is positioned adjacent to the first wing 2. The plurality of belt hooks 91 is connected adjacent to the bracing portion 81. The plurality of belt hooks 91 is also distributed across the bracing portion 81. In the preferred implementation, the bracing portion 81 rests adjacent to the back cushions of a car seat. This allows the seat-belt strap to be inserted through each of the plurality of belt hooks 91. The plurality of belt hooks 91 is meant to be used with conventional sash belt type seat-belts. The plurality of belt hooks 91 is sized to allow a seat-belt tongue to pass easily through each of the plurality of belt hooks 91 and connect to a seat-belt buckle disposed on the opposite side of the car seat. The seat-belt webbing interlocks with the plurality of belt hooks 91 and presents a physical barrier which limits forward movement of the present invention.

As can be seen in FIG. 4, in another embodiment of the present invention, the car-seat securing mechanism comprises a seat-belt connector 93. The bracing portion 81 of the standing base 8 is positioned adjacent to the first wing 2. The seat-belt connector 93 is tethered to the bracing portion 81. In this embodiment, the seat-belt connector 93 loops through an elongated slot cut into the offsetting flange 11. The seat-belt connector 93 comprises a seat-belt tongue slid over a strap. The seat-belt tongue may be locked into position along the seat-belt strap under the discretion of the user. The overall length of the seat-belt connector 93 may also be adjusted to the liking of the user. The seat-belt tongue connects to the seat-belt buckle placed on the side of the car seat. Thus, the present invention can be engaged to the car seat by connecting the seat-belt tongue found in the seat-belt connector 93 to the seat-belt buckle on the car seat. The seat-belt buckle is provided with a push button disengagement mechanism allowing the seat-belt tongue to disconnect with the seat-belt buckle.

Figure 6:
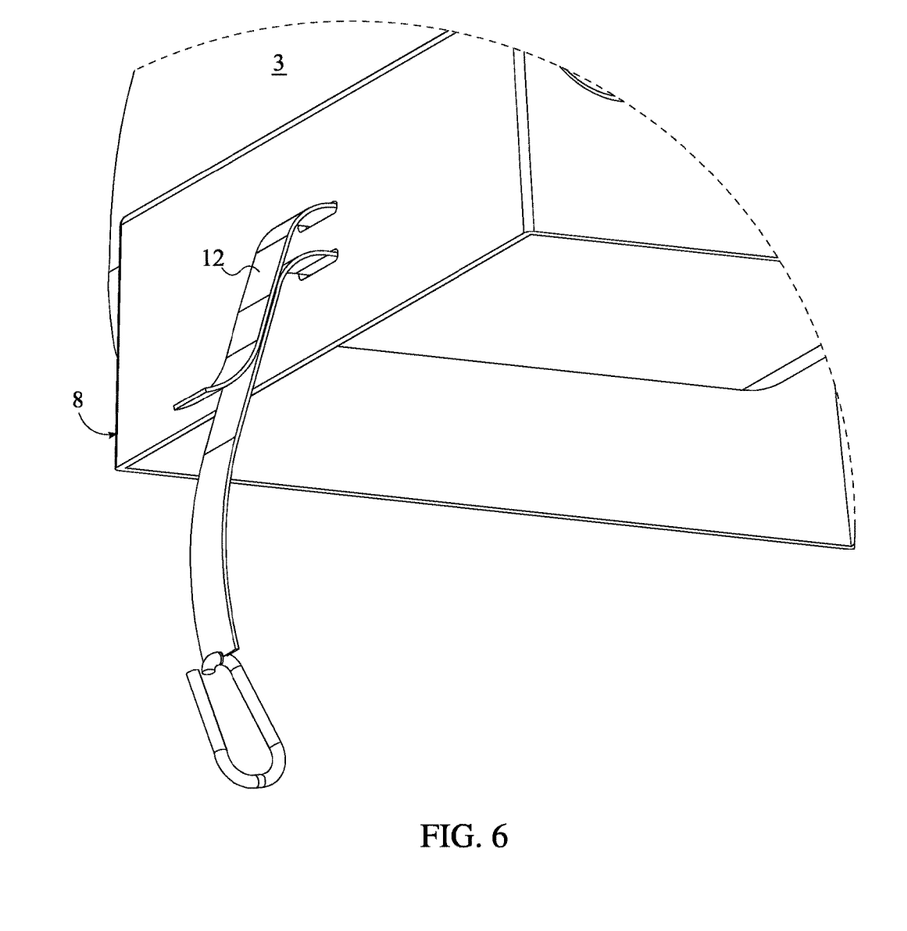
FIG. 6 is detail bottom perspective view showing the first supplemental seat fastener.

Referring now to FIG. 6, the first supplemental seat fastener 12 is tethered to the standing base 8. The first supplemental seat fastener 12 and the car-seat securing mechanism 9 is positioned opposite to each other about the standing base 8. Inertia causes the present invention move backwards into the seat cushion when the car accelerates forward. The first supplemental seat fastener 12 is attached to the front of the car opposite the bracing portion 81 to arrest the backward momentum of the present invention when the car is accelerating. A latch mounted to the end of the first supplemental seat fastener 12 connects to a front anchoring point located in front of the seat cushion. The front anchoring point may comprise an anchor bar that interlocks with the latch on the first supplemental seat fastener 12. The first end of the latch comprises a hook, and the second end of the latch comprises a swiveling bar. In order to connect the first supplemental seat fastener 12 to the latch, the swiveling bar retracts into the concave side of the hook, which allows the user to insert the anchor bar into the hook. Once the anchor bar is inside the hook, the swiveling bar extracts and closes the hook. The front anchoring point for the first supplemental seat fastener 12 is placed on or near the cabin floor of the car. In alternate embodiments of the present invention, the latch may utilize a variety of detachable coupling mechanisms including, but not limited to, snap locking fasteners, magnetic fasteners, clasps, or like fastening mechanisms that can easily engage with front anchoring point.

Figure 3:
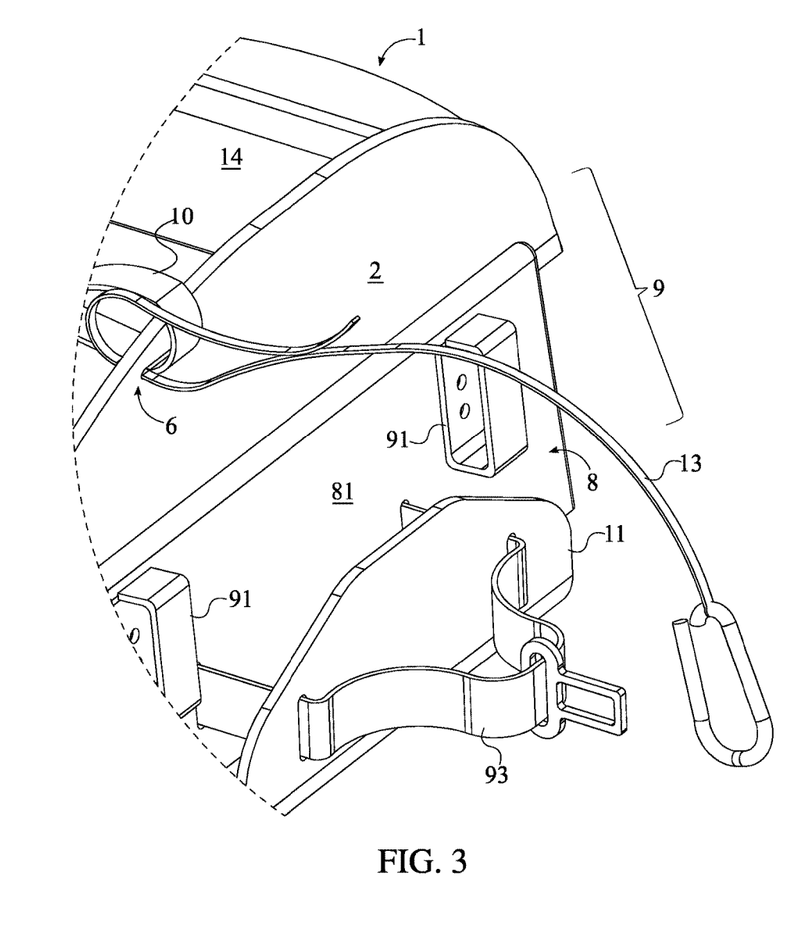
FIG. 3 shows a detail perspective view of the bracing portion and the second harness attachment point.

As can be seen in FIG. 3, the second supplemental seat fastener 13 is tethered to the first wing 2. The second supplemental seat fastener 13 is used to connect the present invention to a rear anchoring point located on the back of the car seat. The acceleration of the car causes the present invention to rotate in the clockwise or counterclockwise direction depending on the direction of acceleration. The second supplemental seat fastener 13 mounts on the first wing 2 at a vertical position that arrests this rotational movement. A latch is used to connect the second supplemental seat fastener 13 to the rear anchoring point. The rear anchoring point may be situated anywhere on the rear of the car seat, such as on the bottom of the head rest, the rear surface of the back cushion, or on the floor immediately behind the car seat. The latch selectively couples to the anchoring bar which connects the second supplemental seat fastener 13 to the rear anchoring point.

Referring once again to FIG. 1, a washable veterinary lining 14 is attached onto and across the resting panel 1 opposite the standing base 8. In the preferred embodiment of the present invention, the washable veterinary lining 14 comprises a soft hydrophilic fabric material placed on top of the resting panel 1. Alternately, the washable veterinary lining 14 may be integrated onto the interior surfaces of the resting panel 1. The washable veterinary lining 14 is placed between the animal and the resting panel 1 to prevent animal's skin from rubbing on the resting panel 1. The hydrophilic material absorbs bodily fluids excreted by the animal, as is common when animals are injured or hurt. Once the animal is successfully transported, the washable veterinary lining 14 is removed and put through a washing process. The washing process utilizes a sterilizing sub-process that neutralizes any harmful contagious viruses or organic matter. The washing process effectively removes all contaminants absorbed in the hydrophilic material, making the washable veterinary lining 14 reusable.

Figure 5:
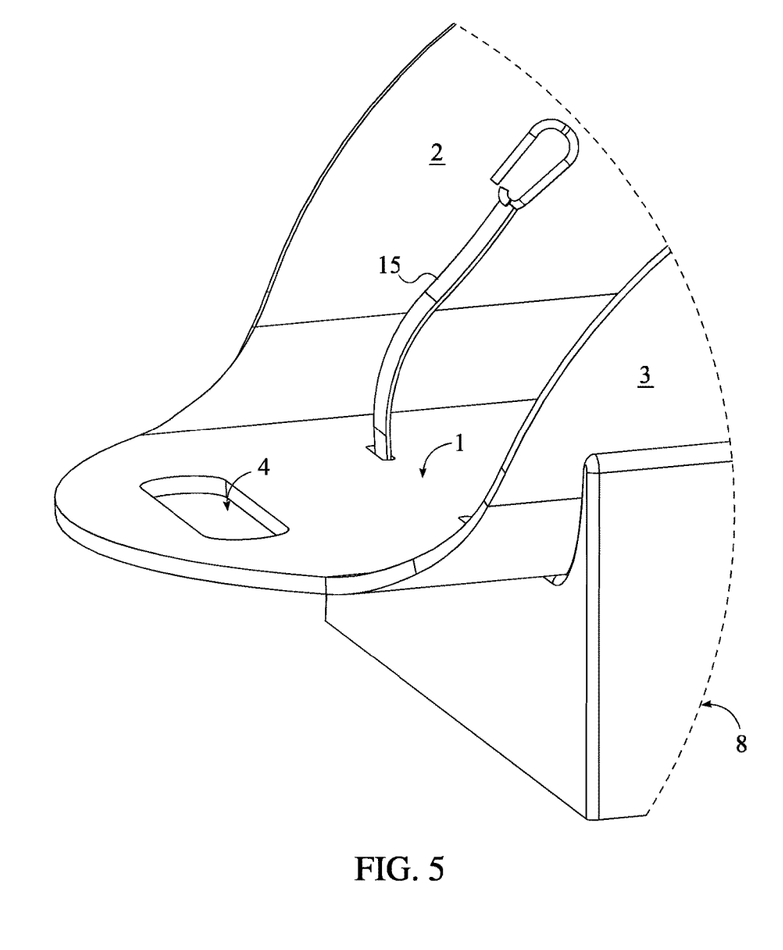
FIG. 5 is a detail perspective view of the present invention showing the third harness-attachment point.

As can be seen in FIG. 5, a third harness-attachment point 15 is integrated into the resting panel 1. The third harness-attachment point 15 is positioned in between the first wing 2 and the second wing 3. The third harness-attachment point 15 comprises a left slot and a right slot. Both the left slot and the right slot can connect to a leash strap that connects to the collar of the animal. The third harness-attachment point 15 is used restrain the animal and keep its body close to the resting panel 1. The user has the option to use either the left strap or the right strap, separately. Both the left strap and the right strap can be used at the same time to restrain a large animal.

Although the invention has been explained in relation to its preferred embodiment, it is to be understood that many other possible modifications and variations can be made without departing from the spirit and scope of the invention as hereinafter claimed.

What is claimed is:

1. A transportable cradle for injured animals comprises:
a resting panel;
a first wing;
a second wing;
a first handle;
a second handle;
a first harness-attachment point;
a second harness-attachment point;
a standing base;
a car-seat securing mechanism;
the resting panel being connected onto the standing base;
the car-seat securing mechanism being laterally mounted to the standing base;
the first wing being connected adjacent to the resting panel;
the second wing being connected adjacent to the resting panel, opposite the first wing;
the first handle and the second handle being integrated into the resting panel;
the first handle and the second handle being positioned opposite to each other across the resting panel;
the first handle and the second handle being positioned perpendicular to the first wing and the second wing;
the first harness-attachment point being integrated into the first wing; and
the second harness-attachment point being integrated into the second wing.

2. The transportable cradle for injured animals as claimed in claim 1 comprises:
an animal harness; and
the animal harness being tethered in between the first harness-attachment point and the second harness-attachment point.

3. The transportable cradle for injured animals as claimed in claim 1 comprises:
an offsetting flange; and
the offsetting flange being laterally connected to the standing base.

4. The transportable cradle for injured animals as claimed in claim 1 comprises:
the car-seat securing mechanism comprises a plurality of belt hooks;
a bracing portion of the standing base being positioned adjacent to the first wing;
the plurality of belt hooks being connected adjacent to the bracing portion; and
the plurality of belt hooks being distributed across the bracing portion.

5. The transportable cradle for injured animals as claimed in claim 1 comprises:
the car-seat securing mechanism comprises a seat-belt connector;
a bracing portion of the standing base being positioned adjacent to the first wing; and
the seat-belt connector being tethered to the bracing portion.

6. The transportable cradle for injured animals as claimed in claim 1 comprises:
a first supplemental seat fastener;
the first supplemental fastener being tethered to the standing base; and
the first supplemental fastener and the car-seat securing mechanism being positioned opposite to each other about the standing base.

7. The transportable cradle for injured animals as claimed in claim 1 comprises:
a second supplemental seat fastener; and
the second supplemental fastener being tethered to the first wing.

8. The transportable cradle for injured animals as claimed in claim 1 comprises:
a washable veterinary lining; and
the washable veterinary lining being attached onto and across the resting panel, opposite to the standing base.

9. The transportable cradle for injured animals as claimed in claim 1 comprises:
a third harness-attachment point;
the third harness-attachment point being integrated into the resting panel; and
the third harness-attachment point being positioned in between the first wing and the second wing.

10. A transportable cradle for injured animals comprises:
a resting panel;
a first wing;
a second wing;
a first handle;
a second handle;
a first harness-attachment point;
a second harness-attachment point;
a standing base;
a car-seat securing mechanism;
an animal harness;
an offsetting flange;
a bracing portion of the standing base being positioned adjacent to the first wing;
the car-seat securing mechanism comprises a plurality of belt hooks;
the resting panel being connected onto the standing base;
the car-seat securing mechanism being laterally mounted to the standing base;
the first wing being connected adjacent to the resting panel;
the second wing being connected adjacent to the resting panel, opposite the first wing;
the first handle and the second handle being integrated into the resting panel;
the first handle and the second handle being positioned opposite to each other across the resting panel;
the first handle and the second handle being positioned perpendicular to the first wing and the second wing;
the first harness-attachment point being integrated into the first wing;
the second harness-attachment point being integrated into the second wing;
the plurality of belt hooks being connected adjacent to the bracing portion;
the plurality of belt hooks being distributed across the bracing portion;
the animal harness being tethered in between the first harness-attachment point and the second harness-attachment point; and
the offsetting flange being laterally connected to the standing base.

11. The transportable cradle for injured animals as claimed in claim 10 comprises:
a first supplemental seat fastener;
a second supplemental seat fastener;
the first supplemental fastener being tethered to the standing base;
the first supplemental fastener and the car-seat securing mechanism being positioned opposite to each other about the standing base; and
the second supplemental fastener being tethered to the first wing.

12. The transportable cradle for injured animals as claimed in claim 10 comprises:
a washable veterinary lining; and
the washable veterinary lining being attached onto and across the resting panel, opposite to the standing base.

13. The transportable cradle for injured animals as claimed in claim 10 comprises:
a third harness-attachment point;
the third harness-attachment point being integrated into the resting panel; and
the third harness-attachment point being positioned in between the first wing and the second wing.

14. A transportable cradle for injured animals comprises:
a resting panel;
a first wing;
a second wing;
a first handle;
a second handle;
a first harness-attachment point;
a second harness-attachment point;
a standing base;
a car-seat securing mechanism;
an animal harness;
an offsetting flange;
a bracing portion of the standing base being positioned adjacent to the first wing;
the car-seat securing mechanism comprises a seat-belt connector;
the resting panel being connected onto the standing base;
the car-seat securing mechanism being laterally mounted to the standing base;
the first wing being connected adjacent to the resting panel;
the second wing being connected adjacent to the resting panel, opposite the first wing;
the first handle and the second handle being integrated into the resting panel;
the first handle and the second handle being positioned opposite to each other across the resting panel;
the first handle and the second handle being positioned perpendicular to the first wing and the second wing;
the first harness-attachment point being integrated into the first wing;
the second harness-attachment point being integrated into the second wing;
the seat-belt connector being tethered to the bracing portion;
the animal harness being tethered in between the first harness-attachment point and the second harness-attachment point; and
the offsetting flange being laterally connected to the standing base.

15. The transportable cradle for injured animals as claimed in claim 14 comprises:
a first supplemental seat fastener;
a second supplemental seat fastener;
the first supplemental fastener being tethered to the standing base;
the first supplemental fastener and the car-seat securing mechanism being positioned opposite to each other about the standing base; and
the second supplemental fastener being tethered to the first wing.

16. The transportable cradle for injured animals as claimed in claim 14 comprises:
a washable veterinary lining; and
the washable veterinary lining being attached onto and across the resting panel, opposite to the standing base.

17. The transportable cradle for injured animals as claimed in claim 14 comprises:
a third harness-attachment point;
the third harness-attachment point being integrated into the resting panel; and
the third harness-attachment point being positioned in between the first wing and the second wing.

* * * * *